United States Patent [19]

Osterman et al.

[11] Patent Number: 4,973,387
[45] Date of Patent: Nov. 27, 1990

[54] APPARATUS AND METHOD FOR REDUCING SOLVENT LOSSES

[75] Inventors: Harry F. Osterman, Westfield, N.J.; Burton Rand, Norristown, Pa.

[73] Assignee: Allied-Signal Inc., Morris Township, Morris County, N.J.

[21] Appl. No.: 372,205

[22] Filed: Jun. 26, 1989

Related U.S. Application Data

[63] Continuation of Ser. No. 699,104, Feb. 7, 1985, abandoned, which is a continuation-in-part of Ser. No. 453,979, Dec. 28, 1982, abandoned.

[51] Int. Cl.$^5$ .......................... B01D 8/00; F28B 7/00
[52] U.S. Cl. ...................... 203/39; 62/238.5; 62/263; 62/324.3; 134/11; 134/31; 134/105; 159/32; 165/110; 202/170; 202/185.1; 202/186; 203/49; 203/87
[58] Field of Search ..................... 202/186, 185.1, 170; 134/11, 31, 40, 105; 62/263, 238.5, 444, 329.3; 203/39, 49, 87; 165/110; 159/32

[56] References Cited

U.S. PATENT DOCUMENTS

| | | | |
|---|---|---|---|
| 1,926,652 | 9/1933 | Rosenfeld | 62/4 |
| 2,090,192 | 8/1937 | Edhofer et al. | 37/6 |
| 2,091,182 | 8/1937 | Mitchell | 202/170 |
| 2,137,479 | 11/1938 | Dinley | 202/170 |
| 2,296,997 | 9/1942 | Knoy | 62/263 |
| 2,525,868 | 11/1948 | Corhanidis | 62/263 |
| 2,650,085 | 8/1953 | Burnett | 266/19 |
| 2,662,850 | 12/1953 | Kraft | 202/186 |
| 2,816,065 | 12/1957 | Legler | 202/170 |
| 2,823,174 | 2/1958 | Pickett | 202/170 |
| 3,227,629 | 1/1966 | Kearney et al. | 202/170 |
| 3,242,057 | 3/1966 | Talian et al. | 134/11 |
| 3,242,933 | 3/1966 | Huff | 134/68 |
| 3,375,177 | 3/1968 | Rand | 202/170 |
| 3,461,039 | 8/1969 | Starmer | 202/186 |
| 3,570,589 | 3/1971 | Biesinger | 202/185 R |
| 4,014,751 | 3/1977 | McCord | 202/170 |
| 4,353,411 | 10/1982 | Harter et al. | 62/263 |
| 4,357,212 | 11/1982 | Osterman et al. | 202/170 |
| 4,409,797 | 10/1983 | King et al. | 62/263 |
| 4,486,239 | 12/1984 | du Fresne | 134/11 |

FOREIGN PATENT DOCUMENTS

| | | |
|---|---|---|
| 464063 | 4/1937 | United Kingdom . |
| 875151 | 12/1960 | United Kingdom . |
| 2051595 | 1/1981 | United Kingdom ................ 134/11 |

OTHER PUBLICATIONS

Johnson et al., "Metal Cleaning by Vapor Degreasing", Sep. 1983, The Dow Chem. Co., pp. 59-63.
The "Cold Trap" Auto Sonics Inc., Nov. 8, 1966.

*Primary Examiner*—Virginia Manoharan
*Attorney, Agent, or Firm*—J. P. Friedenson; C. D. Szuch

[57] ABSTRACT

A volatile solvent conservation modular unit and method for effecting solvent conservation is provided. The cooling coil modular unit is arranged to be disposed in the freeboard zone of a cleaning or degreasing apparatus that uses a volatile solvent. The freeboard zone chiller positioned above the vapor zone and the primary condenser to recover solvent from the relatively less dense solvent/air mixture escaping above the primary condenser and is formed so as to be disposed along one side of the degreaser vessel rather than on all four sides to minimize the obstruction of access into the vapor zone. This one-sided single freeboard chiller positioned on but one side produces a vapor suppression blanket that is effective and is readily retrofitted on existing apparatus without the need for dismantling of the existing unit.

7 Claims, 3 Drawing Sheets

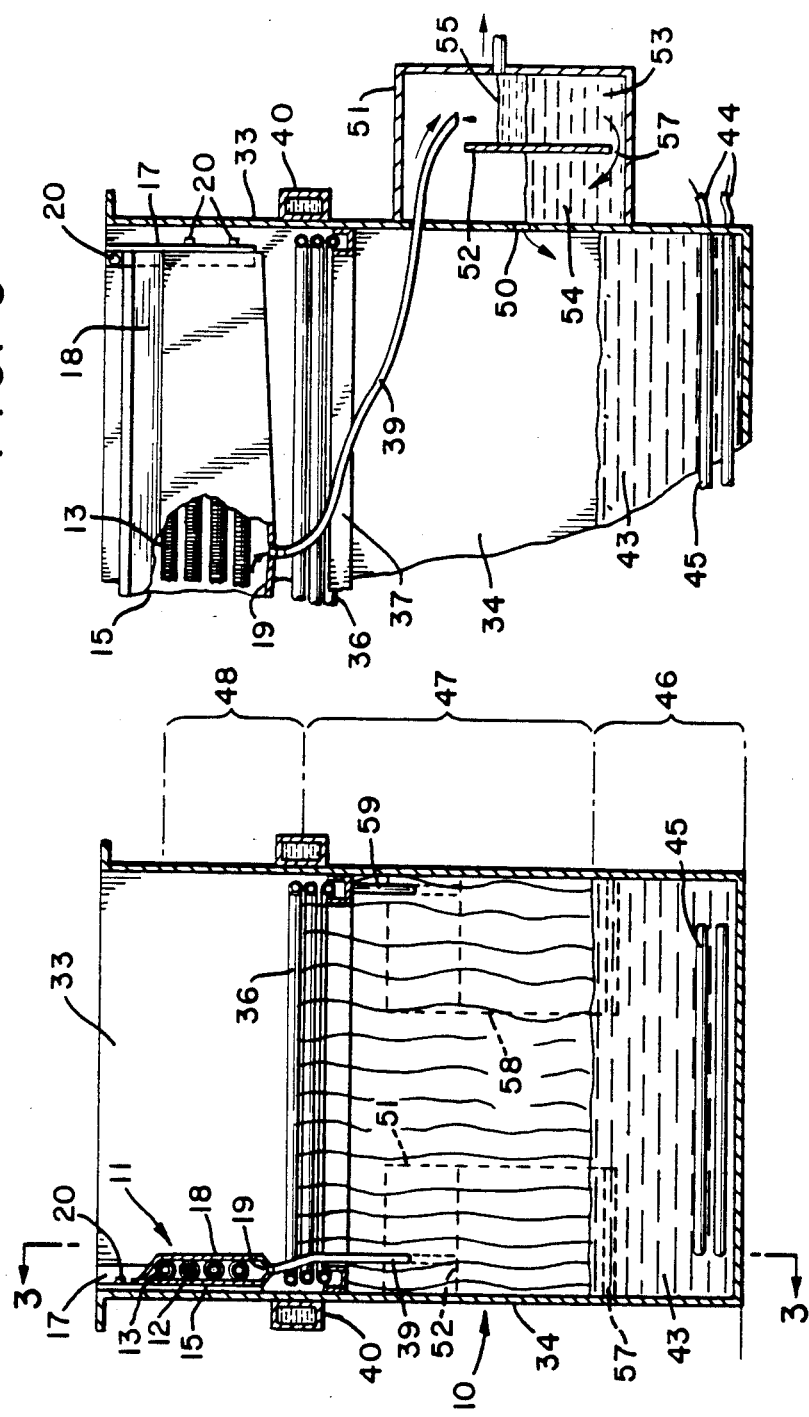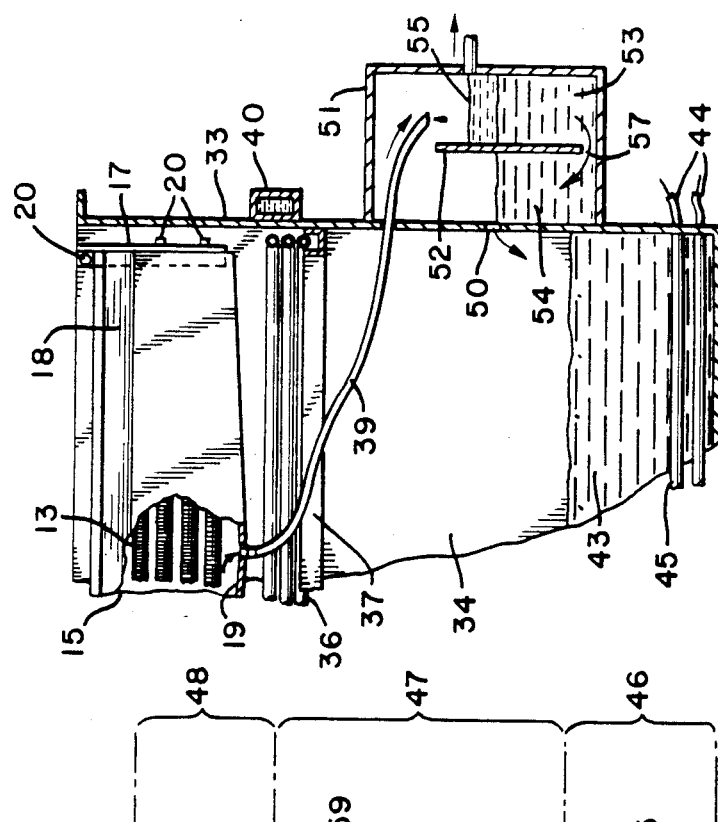

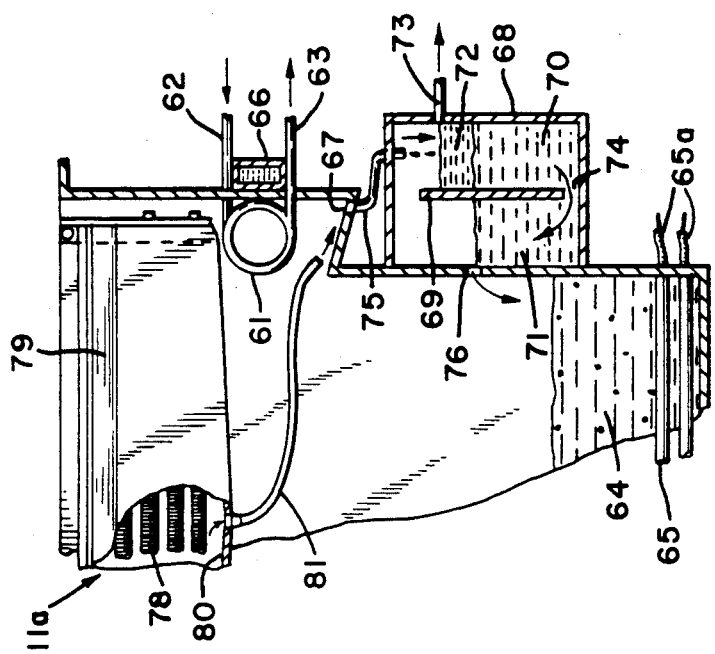
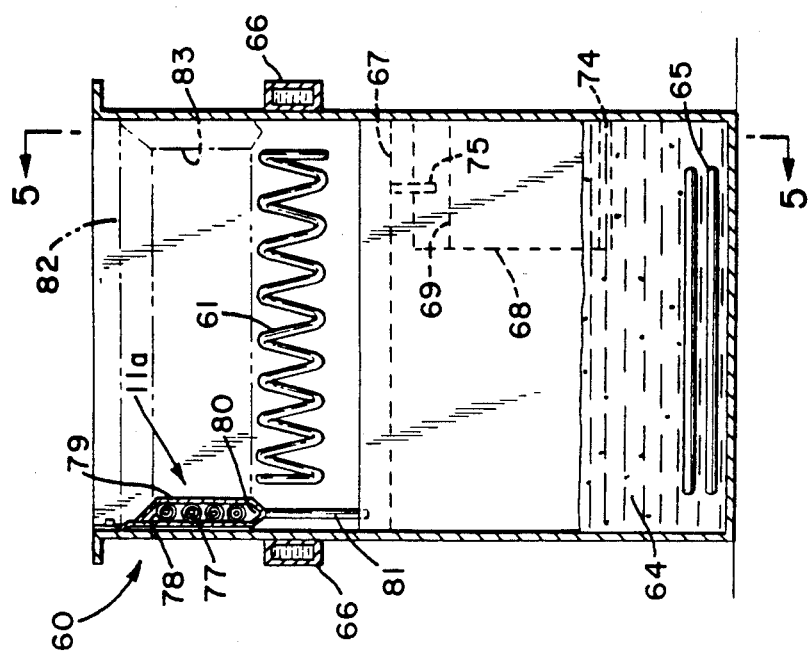

APPARATUS AND METHOD FOR REDUCING SOLVENT LOSSES

This application is a continuation application of U.S. patent application Ser. No. 699,104, filed Feb. 7, 1985, now abandoned; which is a continuation-in-part of U.S. patent application Ser No. 453,979, filed Dec. 28, 1982, now abandoned.

TECHNICAL FIELD

This invention relates to a novel apparatus and process for vapor degreasing which use an open top vessel and more particularly to an improvement in such apparatus and processing which has the purpose of conserving solvent losses occurring from vapor-air diffusion.

BACKGROUND ART

It is recognized in the art of degreasing that the mixing of solvent vapor with air is very costly in terms of solvent loss. Solvent/air mixtures of the kind with which the present invention deals are to be distinguished from vapors which are essentially wholly solvent and appreciably more dense and behave differently. Because halogenated hydrocarbons which are most frequently employed as solvent in degreasing systems are heavier than air, trichloroethylene being an example, the vapor can be controlled by a simple condenser coil or jacket near the top of the degreasing tank. However, when small concentrations of solvent vapor and air intermix, the much lighter combined mixture will be carried off by normal air movement. Even in a quiet atmosphere, the loss due to diffusion in air is considerable. Drafts or improper introduction and removal of the work pieces aggravate the vapor (solvent) loss substantially at this rate.

The normal diffusion of solvent in air is nearest the theoretical minimum when the degreaser is in an area where the working atmosphere is as quiet as possible. Installation of baffles or shields helps to control air movement. Even under ideal conditions, a degreaser is constructed with a freeboard (height of sidewall above the vapor line) preferably of the order of 60% or more of the machine width.

In operation, the degreaser should be large enough and have enough heat input to handle the normal work load. Overloading increases solvent loss. For example, as the work basket is inserted into the degreaser opening, there is considerable intermixing of air and vapor and the resulting turbulence increases the tendency for vapor loss. To stem this very considerable potential loss of solvent by diffusion, a second condenser near the top of the degreaser, which is sometimes referred to as a freeboard chiller, has been devised to suppress the tendency of solvent vapors to escape through the open top of the degreasing apparatus. A vapor condenser or freeboard chiller system of this kind is disclosed in the Rand U.S. Pat. No. 3,373,177 which utilizes a second condenser means above a first condenser and below the upper edge of the open top degreasing vessel into which the parts to be treated are lowered and raised when the parts are withdrawn.

In a degreaser system, vapors are generated in an open topped vessel by boiling a solvent in a heated chamber. The generated vapors rise within the vessel and contact the work piece(s) to be cleansed, generally, metal parts, supported upon a work rest within the vessel. The vapors will dissolve the grease on the metal parts.

The vessel used in degreasing apparatus of this kind is open to provide ready access to the interior of the vessel. The use of an open access vessel in degreasing apparatus, while of great convenience from the standpoint of practical access, has caused several problems. These include: (1) excessive loss of the expensive solvent which is dispersed with air and lost rendering the degreasing operation costly; (2) noxious solvent odors emitted from the apparatus; and (3) a toxic hazard to personnel through air pollution of the work place and the environment.

As noted in U.S. Pat. No. 3,375,177, the objective of the freeboard chiller is to control the vapor/air mixtures generated by the apparatus, but not condensed by the condensing coils or water jacket, before they are expelled into the atmosphere. Low temperature (less than 0° C.) refrigeration coils have been installed in the freeboard zone of degreasers above the primary condensing coils. The cold air blanket produced by these coils acts as a thermal inversion tending to trap rising air/solvent vapor mixtures and effectively condensing a portion of the solvent vapor, thus preventing its escape from the degreasers. Substantial loss reductions have been reported with normal loss reductions of 40% being represented in the industry.

The known low temperature freeboard chillers, such as the kind described in U.S. Pat. No. 3,375,177 are currently incorporated in new degreasers at the time of manufacture, and although such freeboard chillers may be retrofitted on existing degreasers, it is necessary that trained factory personnel be employed for installation. During installation, the trained factory person must cut, fit, mount and solder finned refrigeration tubing around the inner periphery of the degreaser in situ in the freeboard zone and then connect said tubing to a low temperature refrigeration condensing unit. The system must then be checked for leaks and charged with a refrigerant gas. Such installation requires sizeable expenditures. Downtime is also a significant drawback. Also, because of the exacting nature of this type of installation, relative to the fitting of components and preclusion of leaks, as well as the necessity to operationally check the equipment, the purchase of the necessary components for self-assembly by the degreaser owner, as a rule, has not been attempted. It is evident that the installed cost of freeboard chillers is considerably higher due to travel and living costs for the factory trained personnel which must of necessity be borne by the purchaser.

Another limitation in the matter of installation of current freeboard chillers is the reduction in the top opening of the degreaser which results and which can preclude the retrofitting of the solvent saving device due to insufficient clearance for existing workload sizes or the reduction in the maximum workload size that can be placed in a degreaser.

It is obvious from the above that it would be advantageous to develop a low temperature compact freeboard chiller that could be shipped as a completed, sealed with refrigerant included and pretested unit, i.e., a module, that could be installed or retrofitted by the ultimate user, thus eliminating the very substantial travel and living costs from the purchase price required when factory trained personnel must install such systems.

SUMMARY OF THE INVENTION

It is accordingly an object of the invention to provide a novel, modular, low temperature freeboard chiller for open top vapor degreasing units that may be suitably packaged, shipped to, and readily installed by the ultimate user.

A further object of the invention is to provide a novel apparatus for effectively suppressing the escape of vapors to the atmosphere from the top of an open vapor degreaser.

An additional objective resides in the provision of a relatively simple drop-in easily retrofitting unit to prevent escape of air/vapor mixtures.

Additional objects, advantages and novel features of the invention will be set forth in the description which follows.

The objects of the invention are achieved in an apparatus for solvent cleaning of work pieces consisting essentially of an open-top receptacle for containing a volatile solvent said receptacle consisting essentially of a lower liquid solvent zone, an intermediate solvent vapor zone and an upper freeboard zone; means adjacent the bottom of said receptacle to vaporize the solvent; primary condenser means within said receptacle supported by said receptacle at the top of the solvent vapor zone and at the bottom of the freeboard zone for condensing vapors generated from said solvent and thereby defining the upper limit of a vapor zone above the liquid solvent zone; a freeboard chiller comprising a second condenser within said receptacle supported on said receptacle above said primary condenser means and positioned below the upper edge of the receptacle for generating a cold air blanket in the freeboard zone over the top of the solvent vapor zone to trap rising air and solvent vapor mixtures and condensing solvent vapors from the air and solvent vapor mixture forming above said solvent vapor zone, said freeboard chiller being affixed to one interior side wall in the freeboard zone of said open top receptacle; and a condensate collection trough below said first condenser means for collecting condensate and preventing condensed moisture from mixing with the solvent.

To achieve the objects of the invention, a unit comprising refrigerant coils which affords adequate heat exchange capacity, i.e. equal to the capacity which surrounds the opening in the degreasing vessel, is formed so as to be disposed along one side only of the degreaser vessel rather than on all four sides. This one-sided freeboard chiller, contrary to the expected loss of effective vapor suppression when compared to an open top unit as in U.S. Pat. No. 3,375,177 in which the coil surrounds the opening, produced a vapor suppression blanket that is surprisingly effective. The one-sided unit constructed and disposed in accordance with the invention not only affords a substantial economy, including the relative ease of installation, but offers the further advantage of introducing less interference to work piece(s) access, i.e. less obstruction of passage into the open top degreasing vessel.

In order to condense the lighter vapors before they reach the atmosphere, a freeboard chiller unit of the kind disclosed by the present invention and comprising cooling coils is positioned on one upright wall and disposed and supported preferably parallel to one of the walls of the longest dimension of the cleaning apparatus or tank is provided. This freeboard chiller unit comprises a module discrete from and not in fluid communication directly or indirectly with the conventional condensers (lower) coil of the cleaning or degreasing apparatus. The coils of this freeboard chiller are chilled by mechanical refrigeration to temperatures not above about 0° F. (−18° C.) and preferably between about −25° F. (−31° C.) and −35° F. (−37.2° C.). The lowest coil of the freeboard chiller module is located within about eight inches (20.32 cm) of the vapor line and, preferably, at a distance of about six inches (15.2 cm) or less, i.e., about 15 cm, above the vapor line as determined by the primary condensing coil.

The coils of the freeboard chiller are appropriately connected to a compressor and pump unit and refrigerant is pumped through the coils to maintain the coils at a temperature not above 32° F. (0° C.).

BRIEF DESCRIPTION OF THE DRAWINGS

Reference is made to accompanying drawings which form a part of the present application and in which:

FIG. 2 is an elevational sectional view taken along line 2—2 of FIG. 1.

FIG. 3 is an elevational sectional view taken along line 3—3 of FIG. 2.

FIG. 4 is an elevational sectional view similar to FIG. 2 but showing an alternative embodiment.

FIG. 5 is an elevational sectional view taken along line 5—5 of FIG. 4.

DESCRIPTION OF THE PREFERRED EMBODIMENT

Figure 1:
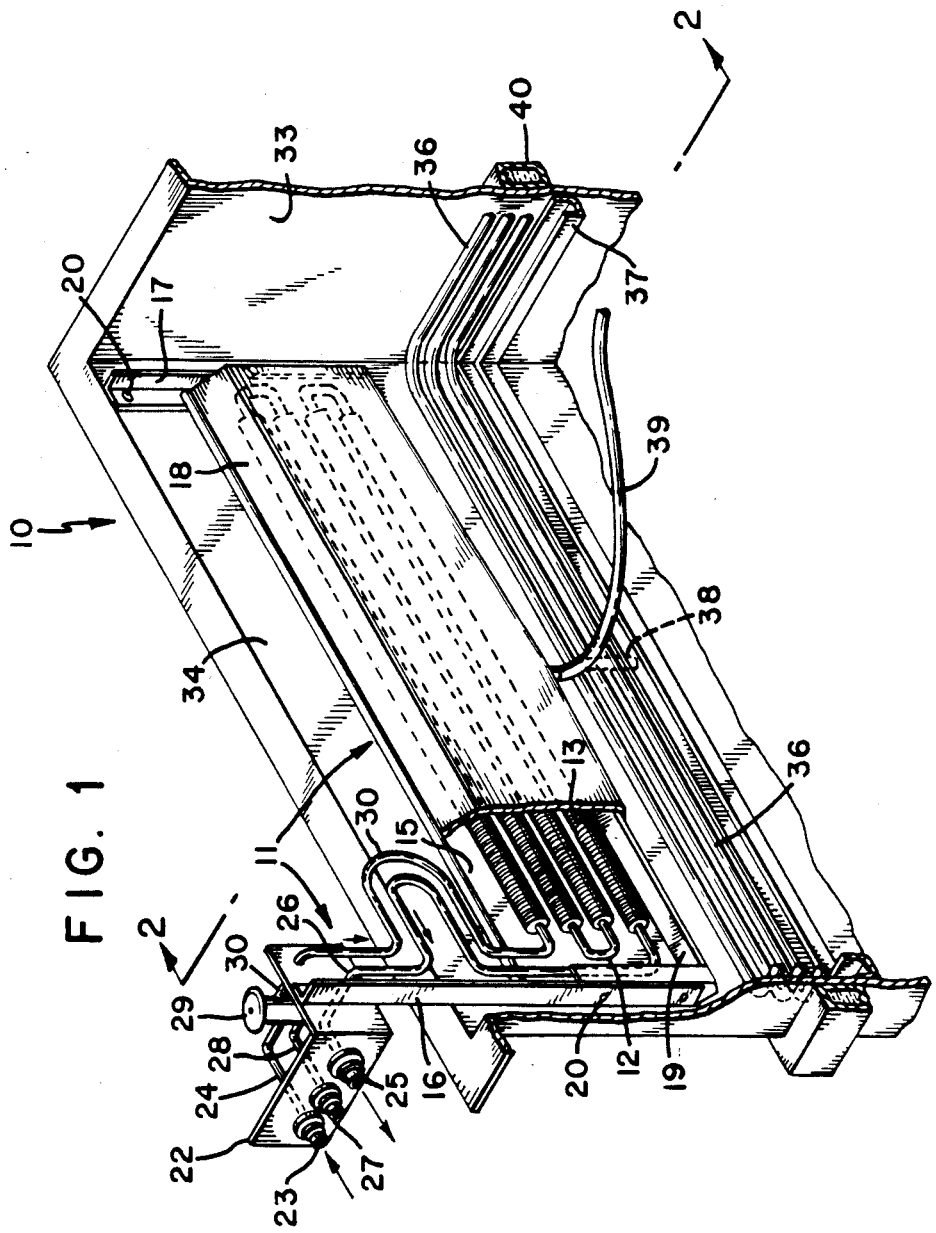
FIG. 1 illustrates perspectively a freeboard chiller modular unit in accordance with the invention installed on one side of the open top degreaser, a fragment of which is illustrated.

While the above-referenced U.S. Pat. No. 3,275,177 describes the use of a freeboard chiller to prevent the loss of solvent vapor from the open top degreaser apparatus, the installation of freeboard chillers of the kind disclosed in that patent requires condenser coils that surround the opening and as noted above are relatively expensive particularly when retrofitting existing units. To alleviate the noxious and sometimes hazardous nature of the vapors defusing from an open top degreaser, lip vent exhausts have been installed along one or two sides of existing degreasers. Such exhausts, while effective in removing the solvent vapors prior to their entering the workers' area, sometimes double or triple solvent losses by creating air turbulence and above the freeboard area of the degreaser. This effect is particularly pronounced with smaller degreasers with short freeboard zones having less than eighteen inches (45.7 cm) between the vapor line and the top opening of the degreaser. A freeboard zone, it will be understood, typically comprises a "fenced in" area, i.e. an atmosphere of air with some minor amount of vapor escaping therein from below. The purpose of the freeboard zone to reduce solvent vapor losses; this zone prevents sweeping of air across the top of and contiguous to the pure vapor zone. Because a freeboard chiller can reduce emissions into the work area enough to eliminate the need for an exhaust equipment, the use of a freeboard chiller is a preferred means of protecting workers by confining the solvent vapors and conserving solvents. However, in the past, the relatively high cost of an effective freeboard chiller has precluded the retrofitting of cleansing or degreasing apparatus with conventional freeboard chillers. This is particularly so with respect to smaller degreasers because of the space reduction in the work piece access opening that would result after the retrofit of a freeboard chiller that would be placed around the entire inner periphery in the freeboard zone. The versatile one-sided freeboard chiller of the present invention makes such retrofitting of solvent cleaning or degreasing apparatus feasible in that the modular freeboard chiller unit of the invention may be shipped to the user in a substantially self-contained unit. The user can readily install it on the degreaser in the freeboard zone and on one side only without the concommitant downtime and expense of installations by manufacturers' technicians that would require breaking into the integrity of the existing system. An advantage of the apparatus of the invention resides, also, in the fact that original equipment manufacturers who build solvent cleaning and/or degreasing apparatus will find that the one-sided configuration for generating a cold blanket of air in the freeboard zone allows the incorporation of a freeboard chiller of this kind on new degreasing apparatus without increasing the physical size of the present design.

In order to obtain the desired effect of a freeboard chiller in accordance with the invention, and having determined the heat extraction capacity (British Thermal Units per foot of perimeter), the required capacity needed to effectively conserve the solvent vapors can be achieved with a suitable number of passes of finned tubing on one side operating at a temperature in the range of from about −20° F. (−28.9° C.) and (−40° C.).

To determine the feasibility of building and shipping a totally completed and tested freeboard chiller that may be installed in an existing degreasing unit that does not have a freeboard chiller, a system was designed for an existing water cooled vapor degreaser that had a top opening of 2 feet by 4 feet (30.5 cm×61 cm). In constructing the unit, the space reduction problem of a more conventional four-sided coil was avoided by placing the total heat exchange capacity along one side of the degreaser as illustrated in FIG. 1. By so doing, it might be assumed that the performance of the system would be reduced compared to a system with finned tubing around all four sides. Following installation, tests were run with the degreaser being operated with trichlorotrifluoromethane, fluorocarbon 113. The first, or base-line test, was run without the freeboard chiller turned on and the test run indicated a loss of 0.1505 lbs per hour per square foot (0.7348 kg/sq. meter/hr.) of vapor air interface. Under identical conditions, with the exception that the freeboard chiller was turned on and was operating at a measured temperature of −35° F. (−37.2° C.), losses were measured at 0.0598 lbs per hour per square foot (0.292 kg/sq. meter/hr.), a reduction in solvent loss of 60.2%. This was a totally unexpected magnitude since tests on a similar sized degreaser operating in the same area with a conventional four-sided freeboard chiller showed loss reductions of 57%. It could not be predicted that the one-sided coil would be able to produce savings on the order of 30% to 40%.

In an effort to ascertain an explanation for the unexpected high solvent savings, the cold air blanket was probed with the thermocouple at various location across this freeboard zone strata in the degreaser, above the vapor line, moving in a direction away from the one-sided modular coil of the invention. The measured temperature varied from a low of −1° F. (−18.3° C.) in front of the coil to +14° F. (−10° C.) at the far side of the degreaser. This relatively small gradient was also unexpected in that the lowest previously measured blanket temperature with a four-sided freeboard chiller was 11° F. (−6.8° C.) at the centroid.

Prior to the test, it had been postulated that while producing the necessary cold air blanket above the vapor zone, the one-sided low temperature coil would produce a convection air current which would flow down from the coil, across the degreaser and rise to the top of the freeboard on the opposite side of the machine from the coil. Such air movement while slow, would tend to produce solvent losses that were greater than those achieved with a (four-sided) system that ringed the opening.

Having found that the solvent loss measurements with the one-sided system were surprisingly beneficial in comparison to the four-sided system, further testing was done to better understand the mechanism.

Such test consisted of injecting smoke at a point immediately below the low temperature coil in the freeboard zone, i.e., in the space between the cold air blanket and the vapor line, and observing its motion. It was found that the smoke moved across the degreaser from the freeboard chiller to the far side. Moreover, as opposed to moving up the wall and out of the degreaser, the smoke moved across the top of the cold air blanket and concentrated at the low temperature coils. This demonstrated that the slow circular air motion within the freeboard area caused by the one-sided coil of the kind provided by the present invention tends to drag escaping vapors to the low temperature area where they are condensed and returned to the system.

It is to be emphasized that the solvent/air mixtures which the apparatus of the present invention processes differ from the relatively denser pure solvent vapor which is substantially relatively readily condensable by a primary condenser coil 36 in the vapor zone 47 shown in FIG. 2 of the drawing and operating at a temperature substantially above 0° C. e.g. about 18° C. to about 27° C.

With primary condenser coils, there are essentially no convection currents, i.e., convection currents are not a significant factor because the relatively pure vapor because its weight does not circulate as dispersed but is held down and moves to the condenser where it is condensed. However, with a solvent/air mixture, convection currents and the tendency of such mixtures to disperse or diffuse are a substantial factor. It is not reasonable to expect that such lighter solvent/air mixtures would be condensed by the primary condenser and in fact, such mixtures have been found not to be condensed but rather account for substantial losses in solvent due to their dispersion or diffusion. The difference between solvent vapors found in zone 47 and solvent/air mixtures found in the freeboard zone 48 and which the apparatus of the invention effectively recovers may be better visualized by an analogy with steam and with moist air, respectively. A mechanism which may be employed to efficiently condense steam is not likely to be the same as the apparatus that efficiently removes entrained moisture from air.

The details of the apparatus of the invention are better visualized by reference to the figures of the drawing. As shown in FIG. 1, the "freeboard chiller" apparatus 11 of the invention which functions to generate a blanket of cold air over the vapor zone in a degreasing or cleaning unit is depicted as being secured to the interior in the freeboard zone of the open container 10. The unit is devised to be readily dropped in place within the solvent cleaning apparatus and secured to one side wall thereof to generate a cold blanket of air across and at the top of the solvent vapor zone 47, said blanket is generated at a distance of about 10 to 18 cm above the vapor line. A fragment only of the open cleaning apparatus container 10 is illustrated and shows a transverse wall 33 and a longitudinal wall 34 of such cleaning apparatus. The freeboard chiller or modular unit 11 comprises a plurality of coils 12 preferably equipped with fins 13 and mounted on a back plate or support 15. The unit 11 is provided with suitable mounting brackets 16 and 17 which facilitate a mounting of the unit 11 on the solvent degreaser unit 10 such as by fasteners 20. The finned coils 12 are preferably equipped with a protective shield 18. Line connectors for the chiller 11 are made through a suitable mounting plate 22 and comprise a liquid refrigerant input line 24 with connector 23, a refrigerant return line 26 with connector 25 and a hot gas (defrost) line 28 with connector 27. The hot gas line 28 is connected to the evaporator feed line 30 at a point downstream from the expansion valve 29. The chiller unit may optionally include a condensate collection trough 19 which may suitable be mounted on the same support 15 on which the cooling coils 12 are mounted. The chiller 11 is positioned in the degreasing unit above the primary condensing coils 36. The primary condensing coils 36 define the vapor line of the degreaser 10, i.e. essentially the upper limit of the zone which contains the concentrated pure solvent vapor. A water jacket 40 is also preferably employed and is situated around the outside walls of the unit 10 substantially at the vapor line.

The several zones of the degreasing unit with the freeboard chiller 11 of the invention is more clearly illustrated in the cross-sectional views of FIGS. 2 and 3. For purpose of better clarity of description, the apparatus includes a liquid solvent zone 46, a solvent pure vapor zone 47 and the freeboard zone 48 of confined air. Located in the solvent boiling sump 43 (zone 46) is a suitable heating coil 45 connected by leads 44 to a suitable electric source. It will be understood that any suitable heating means, internally, as shown, or externally (not shown) may be employed.

The freeboard chiller unit 11, which comprises the novel apparatus of the invention, is positioned in the freeboard zone to recover the solvent vapor which may be present in the vapor air mixture in the zone 48 which is above the pure solvent vapor zone 47 and above the primary condensing coils 36. Condensate collected from the drop in chiller unit 11 may be collected in the chiller trough 19 and separately treated via line 39 in a separator 51 or the condensate may be fed via line 38 and comingled with the condensate from the primary condensing coils 36 collected in the primary coil condensate trough 37. Collected condensate may be processed in a conventional manner, such as shown in the separator 51 where condensate fed into the entry side 53 is separated with a top water layer 55 that is discharged at 56 and the solvent layer is returned to the solvent boiling sump 43 via the passage 57 underneath the separator partition 52 to the deliver side 54 of the separator and through the discharge opening 50. As illustrated in FIG. 2, an independent separator 58 fed by line 59 may be used for the condensate collected by the primary condensing coils 36 and another separator 51 for the condensate from the freeboard chiller 11; although, as referred to above, the condensates from both the freeboard chiller 11 and primary coils 36 may be collected and treated in a single separator.

The space advantage of the invention is described by reference to FIGS. 4 and 5. As shown, the degreasing or cleaning unit 60 is equipped with a single helical primary condensing coil 61 on one of the interior transverse walls of the apparatus. The unit includes a sump 64 with heater 65 connected to electrical means 65a and water jacket 66 that function as described above by reference to corresponding parts in FIGS. 1–3. By use of the freeboard chiller module 11a which is mounted only on one longitudinal interior wall only of the degreaser, restriction of the opening over a conventional installation where the cold blanket generating unit would surround the opening as shown by phantom lines 82 and 83 is minimized. The arrangement shown in FIGS. 4 and 5 in other respects is similar to that described by reference to FIGS. 1–3, i.e., the freeboard chiller includes cooling coils 77 with fins 78, a guard 79, condensate collection trough 80 and condensate discharge line 81. The degreaser tank includes a water jacket 66, a primary condensate collection trough 67 into which the condensate from both the unit 11a and primary coil 61 are collected. The combined condensate as best shown in FIG. 5 passes into the separator from the trough 67 through line 75 to the entry side 70 of the separator 68. In the separator, the water (lighter) layer 72 is discharged at 73 and the heavier solvent layer flows through passage 74 beneath the separator partition 69 into the boiling solvent sump 64 through passage 76.

It will be apparent that various modification may be made to the invention disclosed without departing from the scope of the invention. The various details provided are illustrated to better describe the invention and are not to be considered as placing limitation on the invention other than those recited in the claims.

What is claimed:

1. An apparatus for solvent cleaning of work pieces consisting essentially of:
   (a) an open-top receptacle for containing a volatile solvent said receptacle consisting essentially of a lower liquid solvent zone, an intermediate solvent vapor zone, and an upper freeboard zone;
   (b) means adjacent the bottom of said receptacle for vaporizing the solvent;
   (c) condenser means within said receptacle supported by said receptacle at the top of the solvent vapor zone and at the bottom of the freeboard zone for condensing vapors generated from said solvent and thereby defining the upper limit of the solvent vapor zone above the liquid solvent zone;
   (d) a single freeboard chiller within said receptacle supported on said receptacle above said condenser means and positioned below the upper edge of the receptacle for generating a cold air blanket in the freeboard zone over the top of the solvent vapor zone to trap rising air and solvent vapor mixtures and condensing solvent vapors from the air and solvent vapor mixture forming above said solvent vapor zone, said freeboard chiller being affixed to only one interior side wall in the freeboard zone of said open top receptacle; and
   (e) a first condensate collection trough below said condenser means for collecting condensate and preventing condensed moisture from mixing with the solvent.

2. The apparatus of claim 1 wherein the freeboard chiller comprises a modular unit which is retrofitted on a pre-existing open top receptacle.

3. The apparatus of claim 1 wherein the freeboard chiller is disposed within about 15 cm above the vapor line of the condenser means.

4. The apparatus of claim 1 wherein a second condenser collection trough is situated below said freeboard chiller.

5. A method for condensing solvent vapors from solvent vapor and air mixtures that are generated in an open-top receptacle before they are discharged into the atmosphere, the steps consisting essentially of:

(a) using a primary cooling coil to define at the top a vapor zone immediately above a liquid solvent zone in said receptacle, wherein aid receptacle is maintained open, and (b) entraining the solvent vapors, from the solvent vapor and air mixture not condensed by said primary cooling coil, by a cold air barrier which is generated by a single low temperature second cooling source which is positioned on only one side of the interior of said open top receptacle and migrates across and forms a cold vapor suppression blanket above said vapor zone.

6. The method of claim 5 wherein said blanket is generated at a distance of about 10 to 18 cm above the vapor line defined by said primary cooling coil.

7. The method of claim 5 wherein condensate from said second cooling source is collected separately from the condensate collected by the primary cooling coil.

* * * * *